Feb. 9, 1932. J. VAN VORST 1,844,727
WEATHER EXCLUDING CASING
Filed April 14, 1930
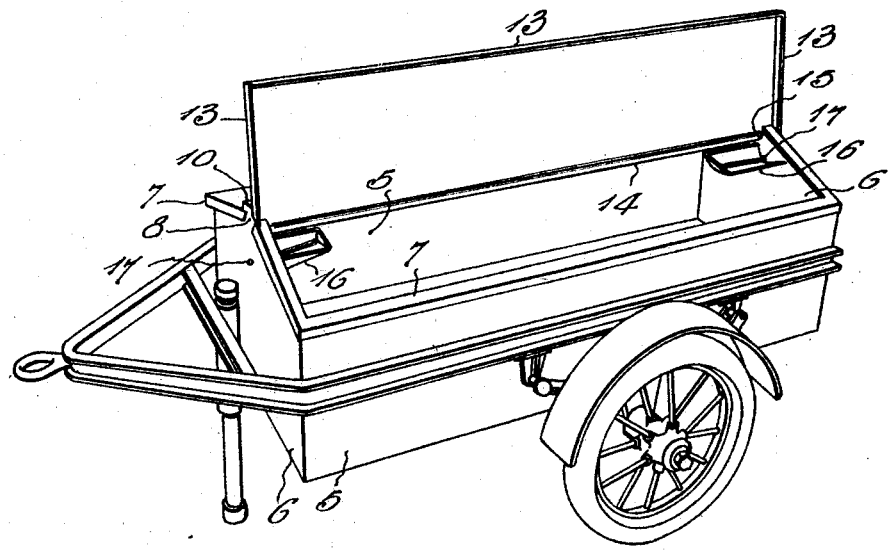
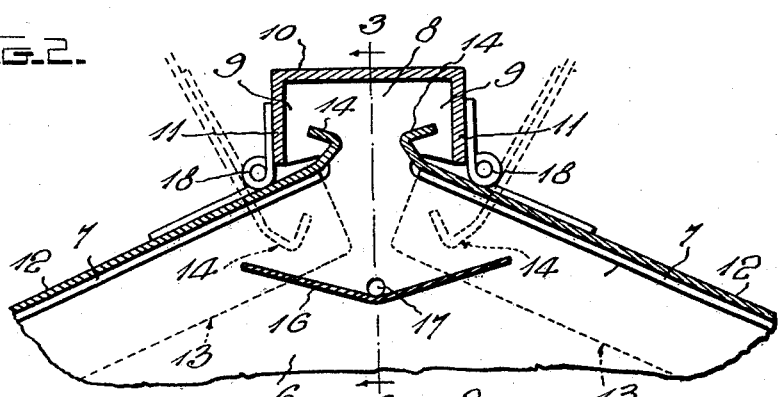
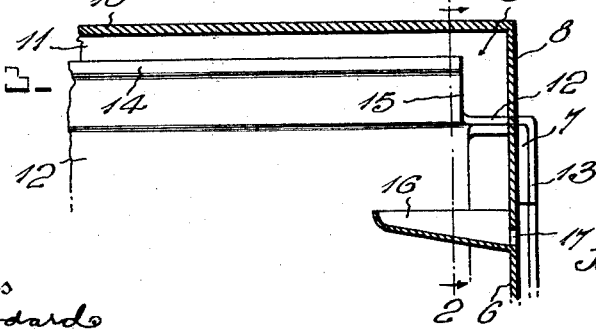
Inventor
John Van Vorst
Witness
H. Woodard
By H. B. Wilson & Co.
Attorneys Patented Feb. 9, 1932

1,844,727

UNITED STATES PATENT OFFICE

JOHN VAN VORST, OF SCHENECTADY, NEW YORK, ASSIGNOR TO MOHAWK ASPHALT HEATER COMPANY, OF SCHENECTADY, NEW YORK, A COPARTNERSHIP CONSISTING OF JOHN VAN VORST AND GEORGE M. BAKER

WEATHER EXCLUDING CASING

Application filed April 14, 1930. Serial No. 444,239.

The present disclosure of the invention is directed to a tool box forming part of a trailer and adapted for use by linemen and others for carrying tools and equipment from one place to another. The box is provided with two upwardly swingable covers, and it is the object of my invention to provide a new and improved construction whereby the entrance of water at the inner longitudinal edges of said covers, is prevented.

While the invention will be described in connection with the illustrated tool box, it will be obvious that it is equally well adapted to other types of weather-excluding casings.

Fig. 1 of the accompanying drawings illustrates a trailer equipped with a tool box embodying the invention.

Fig. 2 is an enlarged vertical transverse sectional view through the upper portion of the box, the hinged covers and the water-excluding construction, this view being cut on line 2—2 of Fig. 3.

Fig. 3 is a fragmentary longitudinal sectional view cut on the plane indicated by line 3—3 of Fig. 2.

A trailer-carried tool box is shown embodying side walls 5 and end walls 6, the upper edges of these walls being preferably reinforced by angle metal bars 7. The upper edges of the end walls 6 preferably incline to central points and at these points, each end wall is provided with an upward projection 8. This projection is of T-shape and the ends 9 of its head portion, overlie the subjacent upper edge portions of the end wall. Extending longitudinally of the box between the two projections 8, and fluid-tightly secured to said projections by welding or other appropriate means, is a ridge bar 10 of arched form in transverse section, said ridge bar being preferably formed from a piece of channel bar, as shown. The longitudinal edges 11 of this ridge bar, preferably terminate about even with the lower edges of the head ends 9 of the T-shaped projections 8.

Two covers 12 are provided to lie upon the upper edges of the side and end walls 5 and 6, said covers being flanged at their ends and at their outer longitudinal edges, as shown at 13. The inner longitudinal edge portions of these covers extend under the longitudinal edges 11 of the ridge bar 10 and under the head ends 9 of the T-shaped projections 8, said inner longitudinal edge portions of said covers being bent upwardly into angular form in transverse section, as seen at 14. These portions 14 are of less length than the remainders of the covers and their ends 15 are disposed at the inner sides of the projections 8. Under these ends 15, two pans 16 are provided, said pans being secured to the inner sides of the end walls 6 and having channel-shaped bottoms declining toward drainage openings 17 formed in said end walls.

The construction shown and described, prevents water from driving in to a large extent and any which does enter at the ends of the upturned cover portions 14, gravitates into the pans 16 and drains off through the openings 17 so that the contents of the box are kept dry. When the covers are raised about hinges 18 which connect them with the ridge bar 10, any water which may run down the upper sides of said covers, will be caught by the formations 14 which then occupy the positions dotted in Fig. 2 and the water will run off into the pans 16 and escape.

While the details disclosed are preferably followed, variations may be made within the scope of the invention as claimed.

I claim:—

In a casing having end walls and upwardly swingable upwardly converging covers extending between said end walls; two shallow pans within the upper end portions of the casing directly under the inner corners of said covers, the pan bottoms being transversely declined from the longitudinal edges of the pans to the longitudinal centers of said pans, said longitudinal centers of said pans being declined to said end walls of the casing, said end walls having drainage openings with which the lowest parts of said pans communicate, said pans being fluid-tightly secured to said end walls, whereby water entering said pans will be discharged through said drainage openings to the exterior of the casing.

In testimony whereof I affix my signature.

JOHN VAN VORST.